Figure 1:
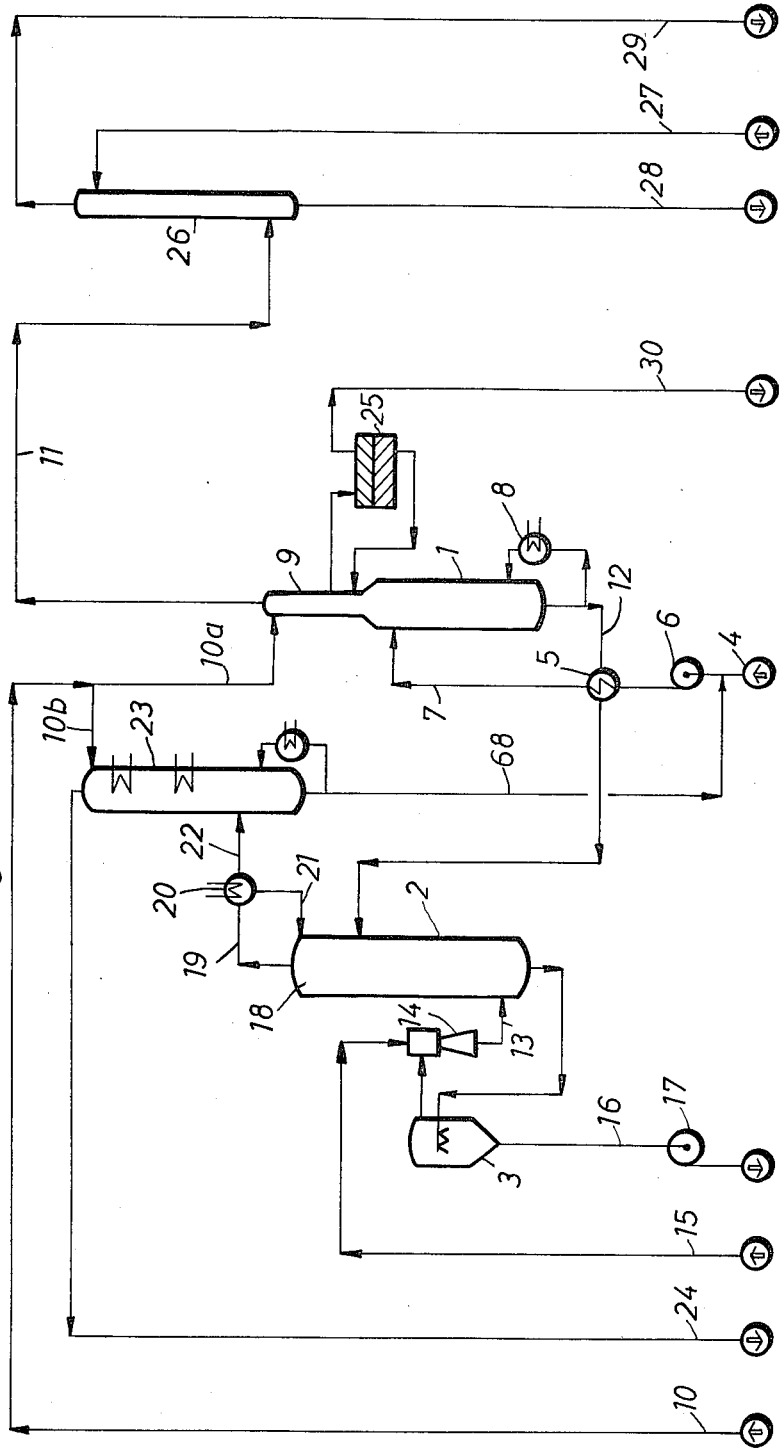

United States Patent [19]

Garber et al.

[11] 4,240,808
[45] Dec. 23, 1980

[54] PROCESSING AQUEOUS EFFLUENT LIQUORS FROM DEGASIFICATION OR GASIFICATION OF COAL

[75] Inventors: Alfred Garber, Linz, Austria; Paul Wiesner, Oberursel, Fed. Rep. of Germany; Hans M. Stonner, Schwalbach, Fed. Rep. of Germany; Fritz Wöhler, Frankfurt am Main, Fed. Rep. of Germany; Alfred Schmidt, Vienna, Austria

[73] Assignee: Metallgesellschaft Aktiengesellschaft, Frankfurt, Fed. Rep. of Germany

[21] Appl. No.: 948,184

[22] Filed: Oct. 2, 1978

[30] Foreign Application Priority Data

Oct. 3, 1977 [DE] Fed. Rep. of Germany ....... 2744437

[51] Int. Cl.³ ...................... B01D 19/00; B01D 53/14
[52] U.S. Cl. .......................... 55/48; 55/54; 55/70; 55/73
[58] Field of Search ..................... 55/42–44, 55/48, 54, 68, 70, 73

[56] References Cited

U.S. PATENT DOCUMENTS

| | | | |
|---|---|---|---|
| 3,505,784 | 4/1970 | Hochgesand et al. | 55/68 X |
| 3,710,546 | 1/1973 | Grunewald et al. | 55/42 |
| 3,972,693 | 8/1976 | Wiesner et al. | 55/42 |
| 4,011,066 | 3/1977 | Bratzler et al. | 55/70 X |
| 4,060,591 | 11/1977 | Garber et al. | 55/70 X |
| 4,149,857 | 4/1979 | Volke et al. | 55/70 X |

Primary Examiner—Robert H. Spitzer
Attorney, Agent, or Firm—Sprung, Felfe, Horn, Lynch & Kramer

[57] ABSTRACT

The aqueous effluent liquors from gasification or degasification of coal are extracted with a water-insoluble solvent and the extract is processed to recover the solvent. The aqueous residue is treated to remove $NH_3$ in a driving-off column. The invention adds the steps of
(a) removing part of the overhead product of the driving-off column as uncondensed vapors;
(b) transferring the vapors from (a) to a scrubbing column, in steps condensing water, small amounts of ammonia and all acid gases in the upper part of said scrubbing column, and withdrawing pure ammonia overhead;
(c) withdrawing the condensate which contains all acid gases from the upper portion of the scrubbing column, transferring the condensate to a separate reboiler, and heating the transferred condensate in said reboiler;
(d) feeding cold water at a low rate to the top of the scrubbing column;
(e) withdrawing the sump product of the scrubbing column, transferring it into a pressurized de-acidification column, and withdrawing therefrom overhead under pressure the acid gases $H_2S$ and $CO_2$; and
(f) recycling to the stripping column the sump product of the pressurized de-acidification column consisting of a solution high in ammonia content.

2 Claims, 2 Drawing Figures

PROCESSING AQUEOUS EFFLUENT LIQUORS FROM DEGASIFICATION OR GASIFICATION OF COAL

This invention relates to a method of processing aqueous effluent liquors which become available as a result of the degasification or gasification of coal, comprising extracting the organic impurities contained in the liquor with an organic solvent which is insoluble or has only a low solubility in water, processing the extract to form raw phenol and fresh solvent, removing residual solvent from the aqueous waste liquor by stripping with gases after the extracting step, scrubbing the gases to recover organic solvents, stripping $NH_3$ from the aqueous effluent liquor in a driving-off column after the extracting step, condensing the overhead product of the driving-off column and recycling part of the condensate to the top of the column.

In a known method of processing aqueous effluent liquors which become available as a result of the degasification or gasificiation of coal, dissolved organic substances are extracted by a solvent which is insoluble in water or has only a low solubility in water, the aqueous liquor is stripped with steam after the extracting step to remove residual solvent and the $CO_2$, $H_2S$ and $NH_3$ contents, ammonia is driven off in a column having a rectifying section from the aqueous liquor after the extracting step, and the reflux is withdrawn through a side outlet from a withdrawing plate of the column.

In that method, the aqueous waste liquor which has been subjected to the extraction and from which acid gases have been driven off under pressure for de-acidification can be fed to the column for driving off ammonia below the side outlet for the reflux and the reflux withdrawn through the side outlet can be added to the aqueous effluent liquor which is being fed to the means for de-acidification under pressure (Opened German specification No. 22 29 213; U.S. Pat. No. 3,972,693).

The known methods have the disadvantage that they involve a high expenditure and yet do not perfectly separate the several components of the aqueous effluent liquors as would be required for a profitable processing by which pure products, such as pure $NH_3$, are recovered.

It is an object of the invention to avoid these and other disadvantages and to provide a simple and economical method of processing aqueous effluent liquors which become available as a result of the degasification or gasification of coal. The organic solvent used for extracting should be recovered and re-used as completely as possible. Ammonia should be recovered in a high concentration. All toxic substances contained in the aqueous condensate, particularly the phenols, should be removed to such a degree that the purified aqueous effluent liquor can be subjected to a normal biological purification.

This object is accomplished according to the invention in that (a) part of the overhead product of the driving-off column is not condensed, (b) the vapors are transferred to a scrubbing column, wherein water, small amounts of ammonia and all acid gases are condensed in steps in the upper part of said scrubbing column, from which pure ammonia is withdrawn overhead;

(c) the condensate which contains all acid gases is withdrawn from the upper part of the scrubbing column and transferred to a separate reboiler and heated therein;

(d) cold water is fed at a low rate to the top of the scrubbing column;

(e) the sump product of the scrubbing column is withdrawn and transferred into a pressurized de-acidification column, from which the acid gases $H_2S$ and $CO_2$ are withdrawn overhead under pressure; and (f) the sump product of the pressurized de-acidification column consisting of a high-ammonia solution is recycled to the driving-off column.

In another embodiment of the invention aqueous effluent liquor which has been contacted with the organic solvent in the extraction step is transferred directly to the pressurized deacidification column, in which the acid gases $H_2S$ and $CO_2$ are withdrawn overhead in step (e), organic solvent is withdrawn from the upper part of the pressurized de-acidification column, the water from which the acid gases have been removed is subsequently transferred to the driving-off column (a) and is stripped with steam therein, the $NH_3$-containing vapors are transferred to the scrubbing column, from which pure $NH_3$ is withdrawn overhead in step (b), and the sump product of the scrubbing column, which consists of a high-$CO_2$ solution, is transferred in step (e) to the pressurized de-acidification column.

The advantages afforded by the invention reside particularly in that it enables a simple and economical purification and detoxication of the aqueous liquors which become available as a result of the degasification or gasification of coal. Specifically, the proposed method enables a perfect separation of the acid and alkaline gaseous constituents. The equipment expenditure is low. Simple columns are used, which require only little maintenance and supervision. No extraneous chemicals are needed because only physical methods are used.

Figure 2:
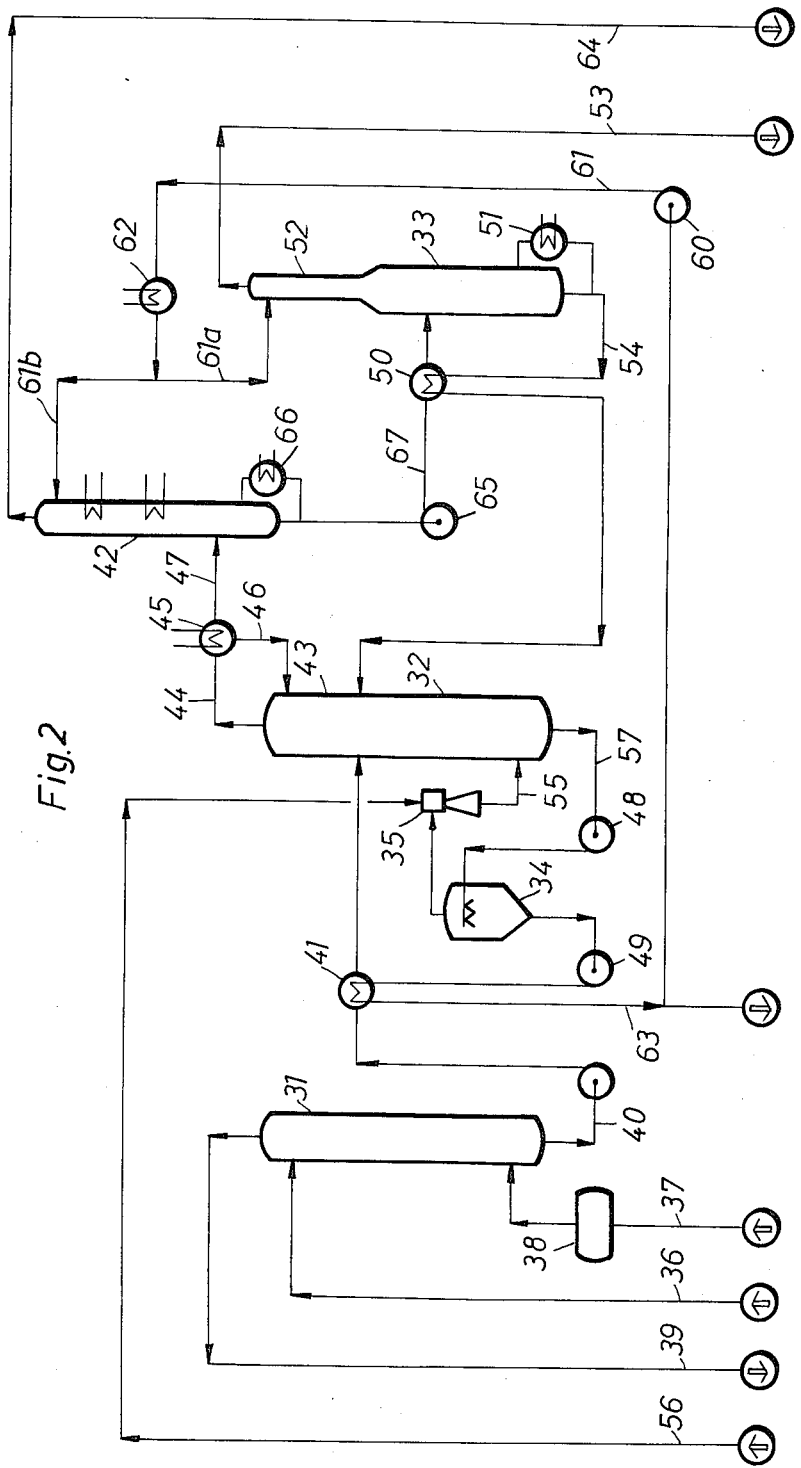

The invention is illustrated diagrammatically and by way of example in the accompanying drawings, wherein:

FIG. 1 is a schematic flow sheet of one system for carrying out the present invention; and FIG. 2 is a schematic for carrying out the invention.

In FIG. 1, the following parts are identified:

Pressurized de-acidification column 1, driving-off column 2, flash cooler 3, source 4 of aqueous effluent liquor which has been dephenolized (by extraction), heat exchanger 5, pump 6, conduit 7 for feeding aqueous effluent liquor which has been dephenolized (by extraction) into the pressurized de-acidification column, reboiler 8, backwashing zone 9, source 10 of cold water, conduit 11 for overhead product of pressure de-acidification column, conduit 12 for hot aqueous effluent liquor which has been de-acidified, steam source 13, steam jet ejector 14, entraining steam conduit 15, conduit 16 for withdrawing water which has been purified and cooled, pump 17, rectifying section 18 of driving-off column, conduit 19 for overhead product of driving-off column, condenser 20, conduit 21 for refluxing condensate to the top of driving-off column, conduit 22 for non-condensed overhead product, scrubbing column 23, conduit 24 for gaseous $NH_3$, solvent separator 25, scrubbing column 26 fed with phenol, raw phenol conduit 27, conduit 28 for solvent-laden raw phenol, conduit 29 for $CO_2$ and $H_2S$, solvent conduit 30 and conduit 68 for removing liquor from the sump of scrubbing column 23.

The following parts are identified in FIG. 2;

Stripping column 31 for removing organic solvent from the aqueous effluent liquor, driving-off column 32, pressurized deacidification column 33, flash cooler 34, steam jet ejector 35, conduit 36 for feeding aqueous effluent liquor which has been dephenolized (by extraction) to the stripping column, inert gas conduit 37, gas blower 38, conduit 39 for withdrawing overhead product consisting of solvent-laden inert gas, conduit 40 for withdrawing solvent-free water from the sump of stripping column 31, heat exchanger 41, scrubbing column 42, rectifying section 43 of driving-off column, 44 conduit for overhead product of driving-off column, condenser 45, conduit 46 for refluxing condensate to the top of driving-off column 32, conduit 47 for uncondensed vapors, pump 48, pump 49, heat exchanger 50, reboiler 51, backwashing zone 52, conduit 53 for overhead product ($CO_2$, $H_2S$) from backwashing zone, conduit 54 for withdrawing hot sump product from pressurized de-acidification column 33, steam conduit 55 leading to the sump of driving-off column 32, conduit 56 for entraining steam, conduit 57 for withdrawing water which has been de-acidified and is free from $NH_3$, pump 60, conduit 61 for water which has been de-acidified and is free from $NH_3$, cooler 62, conduit 63 for main stream of aqueous liquor, conduit 64 for gaseous $NH_3$, pump 65 for sump product of scrubbing column, reboiler 66 for scrubbing column 42, conduit 67 for sump product of scrubbing column.

Referring now more particularly to the drawings, in FIG. 1 aqueous effluent liquor which has previously been dephenolized by extraction is pumped by pump 6 from reservoir 4 through heat exchanger 5, entering pressure de-acidification column 1 through line 7. A portion of the underflow from column 1 is heated at 8 and re-cycled, another portion leaving at 12, preheating feed in exchanger 5 and entering driving-off column 2.

Underflow from 2 passes on to flash cooler 3 where purified cooled water falls to the bottom and is pumped by pump 17 from line 16 to a reservoir. Overhead in flash cooler 3 gases come off and enter steam jet ejector 14 which is fed with steam from 15, the steam plus gases entering column 2 near the bottom through line 13.

In the rectifying section 18 of column 2 vapors are taken off at 19, partially condensed at 20, condensate recycled at 21 and uncondensed material advanced through conduit 22 to scrubbing column 23.

Cold water is also fed to scrubbing column 23 through lines 10 and 10b, part of the underflow from the column 23 being heated and recycled and the balance advancing through line 68 to merge with fresh feed from 4. Pure gaseous ammonia comes off overhead from scrubber 23, being collected at 24.

Another portion of cold water from 10 enters column 1 at 10a at the top of backwashing zone 9. From the bottom of such zone liquid is withdrawn and stratified in solvent separator 25, the lower aqueous layer being recycled to column 1 and the upper organic layer being collected through line 30.

Overhead product from column 1 is withdrawn at 11 and fed to scrubbing column 26 along with raw phenol from reservoir 27. The underflow from column 26 is solvent-laden raw phenol and is collected at 28. The overhead from column 26 is gaseous $CO_2$ and $H_2S$, withdrawn through line 29.

In FIG. 2 dephenolized aqueous effluent liquor is fed through line 36 into stripping column 31 along with inert gas blown by blower 38 from supply 37. Overhead from 31 solvent-laden inert gas is withdrawn through line 39. The underflow 40 is cooled in exchanger 41 and fed to driving-off column 32 along with water from line 54.

The underflow from column 32 leaves at 57 and is pumped at 48 into flash cooler 34. The falling water is pumped at 49 through heat exchanger 41 and through line 63 withdrawn.

The overhead from flash cooler 34 enters ejector 35 along with steam from line 56, being ejected therewith through line 55 into column 32. Column 32 overhead vapors 44 are cooled in condenser 45, the liquid being recycled at 46 into the rectifying section 43 of column 32. Uncondensed bases leave condenser 45 at 47 and are fed to scrubbing column 42 along with water from line 63, pump 60, line 61, heat exchanger 62 and line 61b.

Overhead from column 42 gaseous ammonia is withdrawn at 64. The underflow is partially reheated and recycled at 66, the balance being pumped at 65 through line 67 and exchanger 50 into pressurized de-acidification column 33. Water from line 61a also is fed to column 33. The aqueous underflow of column 33 being partially heated at reboiler 51 and recycled and partially advanced at 54 through exchanger 50 to column 32 as previously described. The overhead from backwashing zone 52 of column 33 is $CO_2$ and $H_2S$, withdrawn at 53.

In the following examples, the terms "stream" or "streams" refer to the gases, vapors and liquids flowing through the conduits shown in the drawings. The same reference characters are used for conduits and streams.

In Tables 1 and 2, the abbreviation "Tr" means "traces", the abbreviation "Sat." means "Saturation" (not taken into account in balance).

EXAMPLE 1

A method as illustrated in FIG. 1 is suitably employed for processing a high-$CO_2$ aqueous feed liquor having the composition stated in Table 1 for stream 4 (conduit 4). The main components as well as the temperatures and pressures of the streams (in conduits) 10a, 10b, 11, 12, 15, 16, 22, 24, 27, 28, 19, 30, and 68 are also stated in Table 1. Rates are stated in metric tons per hour.

TABLE 1

(corresponding to FIG. 1)

| Conduit or stream | Rates in metric tons per hour | | | | | | Temp. °C. | Pressure bars |
|---|---|---|---|---|---|---|---|---|
| | $NH_3$ | $CO_2$ | $H_2S$ | IPE[1] | $H_2O$ | PM[2] | | |
| 4 | 12 | 30 | 1 | 10 | 947 | — | 35 | 1.1 |
| 10a | — | — | — | — | 22 | — | 33 | at least 1.3 |
| 10b | — | — | — | — | 100 | — | 33 | 5 |
| 11 | Tr | 30 | 1 | 6 | Sat. | — | 35 | 4 |
| 12 | 17.5 | 4.4 | 1.5 | Tr | 1080 | — | 136 | 4.1 |
| 15 | — | — | — | — | 114 | — | — | 5 |
| 16 | Tr | Tr | Tr | Tr | 1182.5 | — | — | Vacuum |
| 22 | 17.5 | 4.4 | 1.5 | Tr | 11.5 | — | 70 | 1.2 |
| 24 | 12 | Tr | Tr | Tr | 0.5 | — | 35 | 1.1 |

TABLE 1-continued (corresponding to FIG. 1)

| Conduit or stream | Rates in metric tons per hour | | | | | | Temp. °C. | Pressure bars |
|---|---|---|---|---|---|---|---|---|
| | $NH_3$ | $CO_2$ | $H_2S$ | IPE[1] | $H_2O$ | PM[2] | | |
| 27 | — | — | — | — | — | 51 | 35 | 4.5 |
| 28 | Tr | Tr | Tr | 6 | Tr | 51 | 49 | 4.0 |
| 29 | Tr | 30 | 1 | Tr | Tr | Tr | 35 | 3.9 |
| 30 | Tr | Tr | Tr | 4 | Sat. | — | 100 | 4 |
| 68 | 5.5 | 4.4 | 1.5 | Tr | 33 | — | 80 | 1.1 |

[1] Isopropyl ether
[2] Phenol mixture

EXAMPLE 2

The method illustrated in FIG. 2 is economically interesting for processing a low-$CO_2$ aqueous liquor having the composition stated for stream 36 (conduit 36). Before the separation of $NH_3$, $CO_2$, $H_2S$ and $H_2O$, the solvent is removed by stripping with gas and is recovered by scrubbing said gas with raw phenol (not shown). The further processing is carried out in accordance with FIG. 2. The main components and the pressures and temperatures of the streams (in conduits) 37, 39, 40, 47, 53, 54, 56, 61, 61a, 61b, 63, 64, 67 are stated in Table 2. Rates are stated in metric tons per hours.

TABLE 2

(corresponding to FIG. 2)

| Conduit or stream | Rates in metric tons per hour | | | | | | Temp. °C. | Pressure bars |
|---|---|---|---|---|---|---|---|---|
| | $NH_3$ | $CO_2$ | $H_2S$ | IPE[1] | $H_2O$ | IG[2] | | |
| 36 | 13 | 10 | 2 | 10 | 975 | — | 50 | 1.4 |
| 37 | — | — | — | — | — | 9000 | 35 | 1.5 |
| 39 | Tr | Tr | Tr | 10 | Sat. | 9000 | 50 | 1.4 |
| 40 | 13 | 10 | 2 | Tr | 975 | — | 49 | 1.5 |
| 47 | 26 | 16 | 4 | Tr | 17.5 | — | 72 | 1.3 |
| 53 | Tr | 10 | 2 | Tr | Sat. | — | 34 | 10 |
| 54 | 16 | 6 | 2 | Tr | 104 | — | 141 | 10 |
| 56 | — | — | — | — | 97 | — | — | 5 |
| 61 | Tr | Tr | Tr | Tr | 87 | — | 55 | 11 |
| 61a | Tr | Tr | Tr | Tr | 16 | — | 33 | 11 |
| 61b | Tr | Tr | Tr | Tr | 71 | — | 33 | 11 |
| 63 | Tr | Tr | Tr | Tr | 1158.5 | — | 55 | 2 |
| 64 | 10 | Tr | Tr | Tr | 0.5 | — | 34 | 1.1 |
| 67 | 16 | 16 | 4 | Tr | 88 | — | 80 | 12 |

[1] Isopropyl ether
[2] Inert gas

It will be appreciated that the instant specification and examples are set forth by way of illustration and not limitation, and that various modifications and changes may be made without departing from the spirit and scope of the present invention.

What is claimed is:

1. In the processing of aqueous effluent liquors which become available as a result of the degasification or gasification of coal, comprising extracting the organic impurities contained in the liquor with an organic solvent which is insoluble or has only a low solubility in water, processing the extract to form raw phenol and fresh solvent, removing residual solvent from the aqueous waste liquor by stripping with gases after the extracting step, scrubbing the gases to recover organic solvent, stripping $NH_3$ from the aqueous effluent liquor in a driving-off column after the extracting step, condensing overhead product of the driving-off column and recycling part of the condensate to the top of the column, including the steps of (a) removing part of the overhead product of the driving-off column as uncondensed vapors;

(b) transferring the vapors from (a) to a scrubbing column, in steps condensing water, small amounts of ammonia and all acid gases in the upper part of said scrubbing column, and withdrawing pure ammonia overhead;

(c) withdrawing the condensate which contains all acid gases from the upper part of the scrubbing column, transferring the condensate to a separate reboiler, and heating the transferred condensate in said reboiler;

(d) withdrawing the sump product of the scrubbing column, transferring it into a pressurized de-acidification column, and withdrawing therefrom overhead under pressure the acid gases $H_2S$ and $CO_2$; and (e) recycling to the driving off column the sump product of the pressurized de-acidification column consisting of a solution high in ammonia content, improvement which comprises (f) feeding liquid consisting essentially of cold water at a low rate to the top of the scrubbing column of (b).

2. A method according to claim 1, wherein the aqueous effluent liquor which has been contacted with the organic solvent in the extraction step is transferred directly to the pressurized de-acidification column, the acid gases $H_2S$ and $CO_2$ gases are withdrawn overhead in step (d), organic solvent is withdrawn from the upper part of the pressurized de-acidification column, the water from which the acid gases have been removed is subsequently transferred to the driving-off column (a) and is stripped with steam therein, the $NH_3$-containing vapors are transferred to the scrubbing column from which pure $NH_3$ is withdrawn overhead in step (b), and the sump product of the scrubbing column, which consists of a high $CO_2$ solution, is transferred in step (d) to the pressurized de-acidification column.

* * * * *